United States Patent [19]
von Hagen et al.

[11] Patent Number: 5,663,534
[45] Date of Patent: Sep. 2, 1997

[54] MOTOR VEHICLE LOUDSPEAKER INSTALLATION HOUSING

[75] Inventors: Tilo von Hagen, Riederich; Oliver Kraus, Herrenberg, both of Germany

[73] Assignee: Mercedes-Benz AG, Germany

[21] Appl. No.: 554,165

[22] Filed: Nov. 6, 1995

[30] Foreign Application Priority Data

Nov. 4, 1994 [DE] Germany .................. 44 39 461.6

[51] Int. Cl.$^6$ .................................................. H05K 5/00
[52] U.S. Cl. ........................................... 181/141; 181/150
[58] Field of Search .................................. 181/141, 150, 181/160; 381/86

[56] References Cited

U.S. PATENT DOCUMENTS

| | | | |
|---|---|---|---|
| 4,277,653 | 7/1981 | Powelzick | 181/150 X |
| 4,337,380 | 6/1982 | Tezuka et al. | 181/150 X |
| 4,790,407 | 12/1988 | Yamamoto et al. | 181/141 |
| 4,877,105 | 10/1989 | Mugikura | |
| 4,905,860 | 3/1990 | Kurihara et al. | |
| 5,080,425 | 1/1992 | Austin | |
| 5,171,054 | 12/1992 | Wilson | |

FOREIGN PATENT DOCUMENTS

| | | |
|---|---|---|
| 30 27 286 A1 | 2/1981 | Germany |
| 31 27 068 A1 | 1/1983 | Germany |
| 36 06 166 A1 | 8/1987 | Germany |
| 92 09 341 U | 10/1992 | Germany |

*Primary Examiner*—Khanh Dang
*Attorney, Agent, or Firm*—Evenson, McKeown, Edwards & Lenahan, P.L.L.C.

[57] ABSTRACT

An installation housing for sound reproduction equipment used, for example, in a motor vehicle side door forms a closed resonance space by providing an indentation in the wall of the bodyshell part, and a half shell which holds the loudspeaker, is placed onto this indentation. A surrounding sealing strip is mounted in between and, together with a closed wall surface of the wall of the bodyshell part, forms a resonance space.

4 Claims, 1 Drawing Sheet

MOTOR VEHICLE LOUDSPEAKER INSTALLATION HOUSING

BACKGROUND AND SUMMARY OF THE INVENTION

The present invention relates to an installation housing for a loudspeaker for a passenger compartment of a motor vehicle, and more particularly to an installation housing arranged on a wall of a bodyshell part, e.g. a side door.

A known loudspeaker housing as shown in German Offenlegungsschrift 31 27 068 and German Utility Model 92 09 341 is open towards a rear side and are fastened to wall parts of the motor-vehicle passenger compartment.

German Offenlegungsschrift 30 27 286 describes a loudspeaker installation housing for a loudspeaker fastened to a plate-like shell which can be placed onto a separate, trough-like housing part in the side lining of a door. The housing part is inserted into the side lining.

German Offenlegungsschrift 36 06 166 describes an inside door panel which is provided with a recess for holding a cup bearing a loudspeaker. Mounted on the outer cup circumference for holding the loudspeaker is a gear ring, which is provided with a pinion arrangement for operating a window winder. The cup with the loudspeaker is mounted rotatably in the recess of the inside door panel and can be rotated by an operating knob.

An object of the present invention is to provide an installation housing which, with sound reproduction equipment installed, effects improved reproduction quality.

This object has been achieved in accordance with the present invention by providing an indentation in the wall of the bodyshell part, and placing a half shell, which holds the loudspeaker, onto this indentation with the mounting in between of a surrounding sealing strip which, together with a closed wall surface of the wall of the bodyshell part, forms a resonance space. This arrangement results in the formation of a relatively large, closed resonance space which gives a large resonance volume. Owing to the fact that both the wall of the bodyshell part and also the half shell, are closed and are not provided with through-passages or openings, a sealed space is formed which is sealed peripherally by the sealing strip. A defined resonance volume is thus produced.

The half shell serves as a holder for the sound reproduction equipment, in particular for the loudspeaker. The reproduction quality of the sound reproduction equipment is improved by the two-shell installation housing, of which one shell is formed by the wall of the bodyshell part itself. In comparison to known loudspeaker housings less material is required for producing the housing because one of the two half shells is formed by the wall of the bodyshell part.

Inasmuch as, in the region of the seal, a large area of bearing contact is provided over the entire circumference of the half shell, costly fastening measures, such as holders, welding bolts or the like are unnecessary. Exact matching of the half shell to the wall of the bodyshell part is only necessary along the surrounding sealing strip.

By virtue of a large-sized sealing strip, relatively large tolerances between the edge of the half shell and the wall of the bodyshell part can be compensated for, in order, nevertheless, to ensure sufficient tightness of the resonance space.

In one embodiment of the invention, the closed wall surface is provided in the region of an indentation in the wall of the bodyshell part. The size of the resonance space is thereby increased without constricting the passenger compartment of the motor vehicle.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
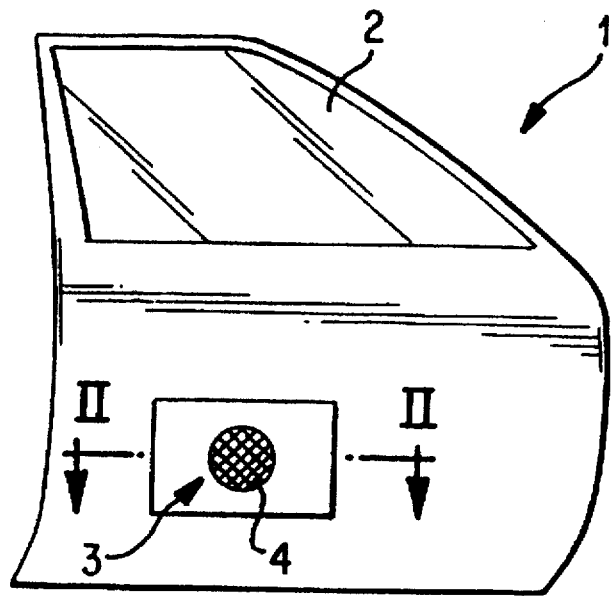
FIG. 1 is a schematic elevation view of a bodyshell part in the form of a motor vehicle side door according to one embodiment of an installation housing according to the present invention.

A bodyshell part 1 according to FIG. 1 is a side door for a motor vehicle and is provided with a window cutout 2 for a side window. An installation housing 3 for sound reproduction equipment, e.g. a loudspeaker 4, is provided below the window cutout 2 on an inner side of the bodyshell part 1. The inner side protrudes into a passenger compartment of the motor vehicle.

Figure 2:
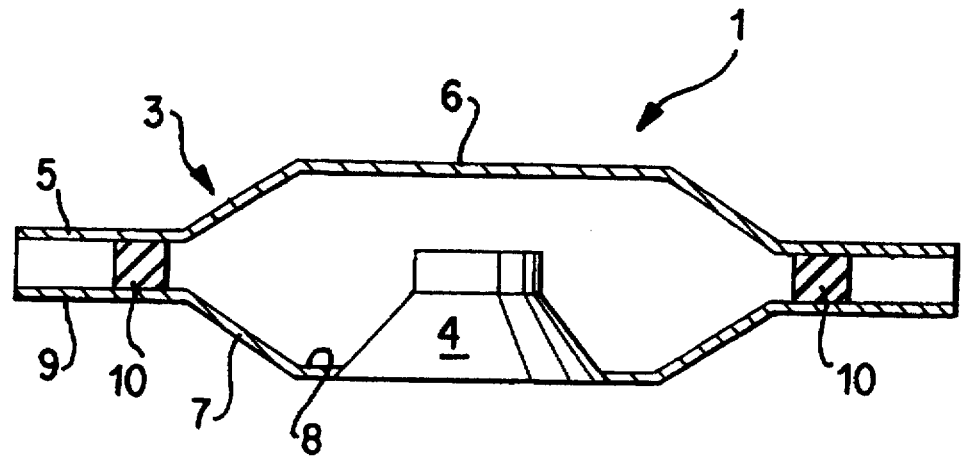
FIG. 2 is a sectional through the installation housing along line II—II in FIG. 1.

According to FIG. 2, the installation housing 3 is formed, on one side, by an indentation 6 in a wall 5 of the bodyshell part 1 and, on the other side, by a correspondingly reverse-shaped bulge 8 in a plastic half shell 7. The bulge 8 and the indentation 6 are configured such that they are symmetrical with respect to each other, but correspondingly mirror-inverted. In other embodiments of the invention the indentation and the bulge are of different dimensions.

The half shell 7 is a plastic component separate from the wall 5 and is provided with an edge 9 which runs around the bulge 8. A loudspeaker 4 is arranged in the bulge 8 such that it can fill the passenger compartment of the motor vehicle with sound. The bulge 8 and the indentation 6 together form a closed resonance space, the depth of which is approximately twice as large as the depth of the loudspeaker 4. The described dimensioning of the depth of the resonance space is not to be understood as limiting. It is only essential that there is sufficient space for the positioning of the loudspeaker.

Both the bulge 8 and the indentation 6 in the wall 5 of the bodyshell part 1 have a closed, continuous wall skin, thus forming a defined resonance space. The edge 9 of the half shell 7 borders, in a tightly surrounding manner, that wall region of the wall 5 of the bodyshell part 1 which surrounds the indentation 6.

To increase the tightness and to compensate for fitting tolerances a large-sized, surrounding sealing strip 10 is provided between the edge 9 of the half shell 7 and the wall 5, with the result that the cavity of the installation housing 3 is also sealed in the region of the side edges of the bulge 8 and the indentation 6. In the illustrated embodiment, the sealing strip 10 is bonded in a simple manner wall 5 and to the edge 9 and thus serves as an element for fastening the half shell 7 to the wall 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A housing in which a motor vehicle loudspeaker is installed, comprising a motor vehicle bodyshell part having a wall provided with an indentation, a half shell configured to hold the loudspeaker and arranged opposite the indentation, and a surrounding sealing strip mounted between the wall and the half shell to define a resonance space.

2. The housing according to claim 1, wherein the surrounding sealing strip is adjacent the indentation.

3. The housing according to claim 1, wherein the body-shell part is a side door of the motor vehicle.

4. The housing according to claim 3, wherein the surrounding sealing strip is adjacent the indentation.

* * * * *